April 19, 1927.
F. E. REEFE
TIRE PUMP
Filed June 22, 1926
1,625,374
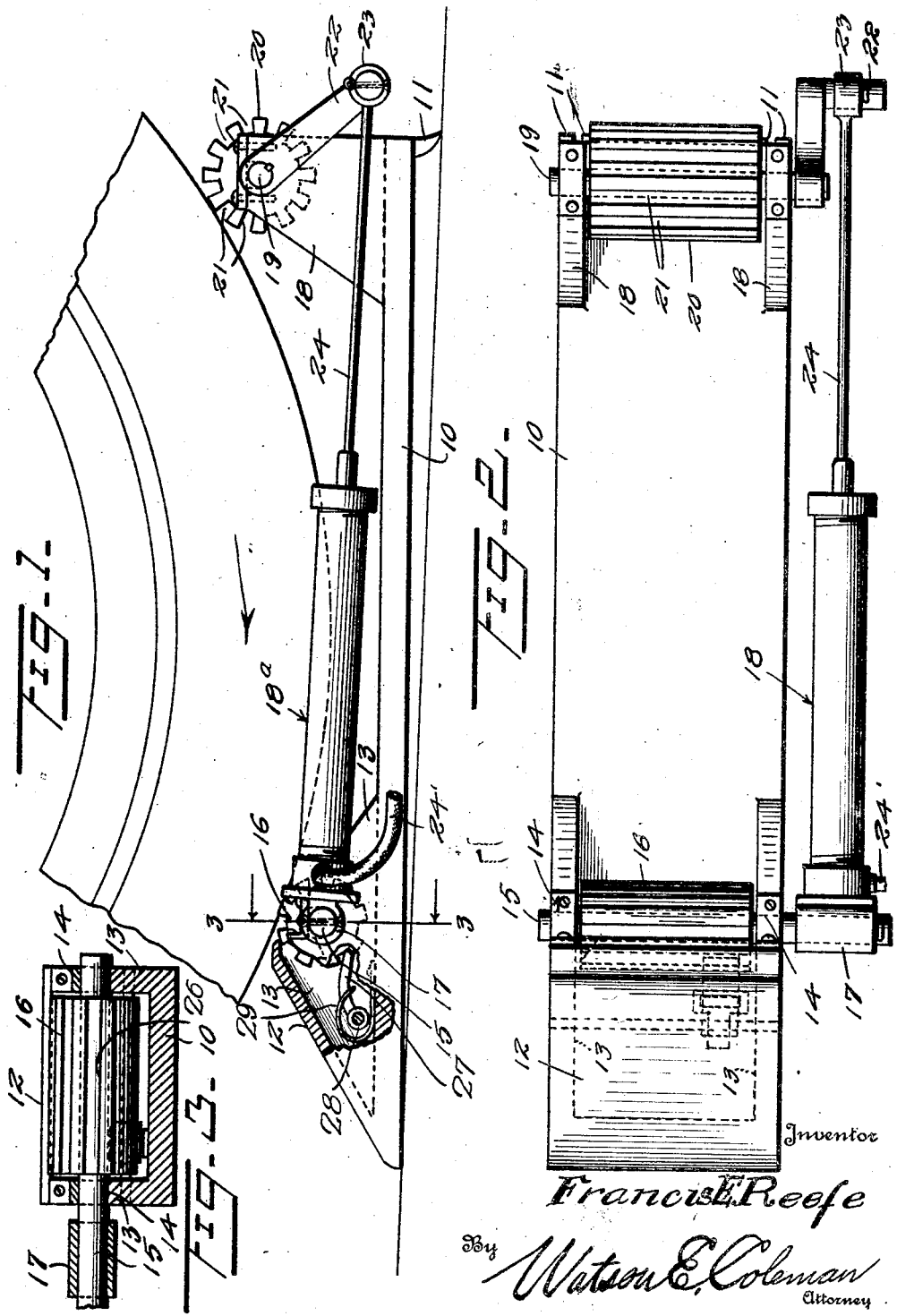
Inventor
Francis E. Reefe
By Watson E. Coleman
Attorney Patented Apr. 19, 1927.

1,625,374

UNITED STATES PATENT OFFICE.

FRANCIS E. REEFE, OF OMAHA, NEBRASKA.

TIRE PUMP.

Application filed June 22, 1926. Serial No. 117,803.

This invention relates to tire pumps and more particularly to a tire pump adapted to be operated from a wheel of the vehicle upon which the tire is to be inflated.

An important object of the invention is to produce a device of this character permitting the use of an ordinary pump construction and providing for the plunger of the pump a relatively long pumping stroke so that the pumping action is expedited.

A still further object of the invention is to provide a device of this character which may be readily and cheaply manufactured and which will be durable and efficient in service.

These and other objects I attain by the construction shown in the accompanying drawing, wherein for the purpose of illustration is shown a preferred embodiment of my invention and wherein:—

Figure 1 is a side elevation partially broken away of a pump constructed in accordance with my invention;

Figure 2 is a plan view thereof;

Figure 3 is a section on the line 3—3 of Figure 1.

Referring now more particularly to the drawing, the numeral 10 indicates a base having upon its under surface at one end thereof depending lugs 11 adapted to engage in the ground and hold the base against longitudinal shifting movements. The upper surface of the base at the opposite end thereof has an upwardly inclining face 12 formed by a web connecting standards 13 arising from the sides of the base. The inner ends of the standards are notched to provide a journal 14 for a shaft 15 upon which, between the standards 13, is mounted a roller 16 which partially underlies the web 12. One end of this shaft projects to one side of the base and forms a pivot for the base 17 of a pump 18ª. At the opposite end of the base and above the lugs 11 the base is provided at its sides with vertical standards 18, the upper ends of which provide journals for a shaft 19 to which is secured, between the standards 18, a drum 20, the periphery of which is transversely slotted, as at 21. The shaft 19 projects to the same side of the base as the shaft 15 and is provided with a crank 22 which is engaged in an eye 23 formed upon the end of the plunger rod 24 of the pump. It will be noted that the standards 18 are higher than the standards 13 so that the drum 20 will form a stop limiting movement of a vehicle wheel which comes into position above the base 10 by moving up the incline 12. When in position over the base, the tire of the wheel engages the roller 16 and drum 20 and is supported thereby with the result that as power is applied to the wheel, the drum 20 is rotated, causing the crank 22 to rotate and the plunger 24 to reciprocate. The pump is provided with the usual flexible outlet tube 24' for connection with the tire valve of the tire which is to be inflated.

In order to provide for ready discharge of the vehicle from the pumping apparatus, the roller 16 is likewise transversely slotted, as indicated at 26, and the ratchet pawl 27 is mounted upon a pivot 28 carried by one of the standards 13 and located between these standards coacts with these notches to prevent rotation of the roller 16 at any time when the vehicle wheel is operating in the normal direction. This pawl is held in engagement by a spring 29 and when the vehicle operates in the normal direction holds the rollers stationary so that the wheel is discharged from between the rollers and passes down the incline wall 12.

Since the construction hereinbefore set forth is obviously capable of a certain range of change and modification without materially departing from the spirit of the invention, I do not limit myself to such specific structure except as hereinafter claimed.

I claim:—

1. In a pumping apparatus of the type described, a base having lugs for engagement with the ground to prevent longitudinal movement thereof, an incline at one end of the base including standards arranged at the sides of the base, a shaft rotatably mounted in the inner ends of the standards and extending transversely of the base and projecting to one side thereof, similar standards arranged at the opposite end of the base, a second shaft mounted therein, a drum secured to the second shaft between the standards, a roller mounted upon the first shaft between the standards, a pump having a base rotatably engaged with the projecting end of the first named shaft, a crank carried by the corresponding end of the last named shaft, a connection between the plunger rod of the pump and the crank, said roller having its surface transversely grooved and a spring-pressed pawl coacting with said grooves and preventing rotation of the roller in a direction such that the upper surface of the roller is moving away from the upper end of said incline.

2. In a pumping apparatus of the type described, a base having lugs for engagement with the ground to prevent longitudinal movement thereof, an incline at one end of the base including standards arranged at the sides of the base, a shaft rotatably mounted in the inner ends of the standards and extending transversely of the base and projecting to one side thereof, similar standards arranged at the opposite end of the base, a second shaft mounted therein, a drum secured to the second shaft between the standards, a roller mounted upon the first shaft between the standards, a pump having a base rotatably engaged with the projecting end of the first named shaft, a crank carried by the corresponding end of the last named shaft, a connection between the plunger rod of the pump and the crank, said roller having its surface transveresly grooved and a spring-pressed pawl coacting with said grooves and preventing rotation of the roller in a direction such that the upper surface of the roller is moving away from the upper end of said incline, said incline and its standards combining with the base to provide a housing for said pawl.

In testimony whereof I hereunto affix my signature.

FRANCIS E. REEFE.